US007356990B2

(12) United States Patent
Burdick et al.

(10) Patent No.: US 7,356,990 B2
(45) Date of Patent: Apr. 15, 2008

(54) ELECTRO HYDRAULIC ACTUATOR WITH SPRING ENERGIZED ACCUMULATORS

(75) Inventors: Wade A. Burdick, Windsor, CO (US); Gary M. Bowman, Loveland, CO (US); Jeffrey T. Stewart, Greeley, CO (US)

(73) Assignee: Woodward Governor Company, Rockford, IL (US)

( * ) Notice: Subject to any disclaimer, the term of this patent is extended or adjusted under 35 U.S.C. 154(b) by 5 days.

(21) Appl. No.: 11/214,269

(22) Filed: Aug. 29, 2005

(65) Prior Publication Data

US 2007/0044461 A1 Mar. 1, 2007

(51) Int. Cl.
*F16D 31/02* (2006.01)

(52) U.S. Cl. .......................................... 60/416; 60/399

(58) Field of Classification Search .................. 60/399, 60/413, 414, 416; 138/31
See application file for complete search history.

(56) References Cited

U.S. PATENT DOCUMENTS 4,051,676 A * 10/1977 Ledeen et al. ................ 60/416
5,148,834 A * 9/1992 Reinartz et al. .............. 138/31

* cited by examiner

*Primary Examiner*—Michael Leslie
(74) *Attorney, Agent, or Firm*—Reinhart Boerner Van Deuren P.C.

(57) ABSTRACT

An electro hydraulic actuator with built-in fail safes is provided. Multiple accumulators are integrated into the actuator to improve reliability and redundancy. One or more accumulators can fail and the remaining accumulators provide sufficient energy to move the actuator to its fail-safe condition.

15 Claims, 5 Drawing Sheets

ELECTRO HYDRAULIC ACTUATOR WITH SPRING ENERGIZED ACCUMULATORS

FIELD OF THE INVENTION

This invention generally relates to electro-hydraulic actuators, and more particularly, to electro-hydraulic actuators having accumulators.

BACKGROUND OF THE INVENTION

Accumulators are devices that store energy in the form of fluid under pressure. Accumulators are useful tools in developing efficient hydraulic systems due to their ability to store excess energy and release it when needed. The accumulators can be used to provide various functions in hydraulic systems. These functions include leakage compensation, pulsation and shock absorption, noise elimination, and load counter-balance.

Traditional accumulators for electro-hydraulic actuators are the nitrogen gas loaded type. These accumulators are generally thought to consist of an elastic membrane charged with nitrogen to provide the potential energy to the hydraulic fluid to operate the actuators. The elastic membranes deteriorate over time, resulting in the nitrogen leaking into the hydraulic fluid. Typically, the nitrogen escapes slowly as the membrane deteriorates over time with no way of detecting the leak. The unknown failure of the accumulator can lead to unreliable operation of the hydraulic system.

Additionally, the accumulators are often added as an afterthought in hydraulic system designs and are haphazardly mounted around the hydraulic system wherever there is room with varying degrees of success.

The invention provides a failsafe electro-hydraulic actuator that overcomes the above-mentioned problems. These and other advantages of the invention, as well as additional inventive features, will be apparent from the description of the invention provided herein.

BRIEF SUMMARY OF THE INVENTION

In one aspect, the invention provides an actuator system having multiple accumulators built into the actuator to provide fail-safe functionality. The integration of the accumulators results in a fully tested and validated, redundant fail-safe actuator.

In another aspect, the invention replaces the membrane and nitrogen charged base accumulator with a spring-loaded piston accumulator. With the use of multiple accumulators built into the actuator, any accumulator can cease to function properly when required and the other accumulators will fully stroke the actuator/valve to its fail-safe condition.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
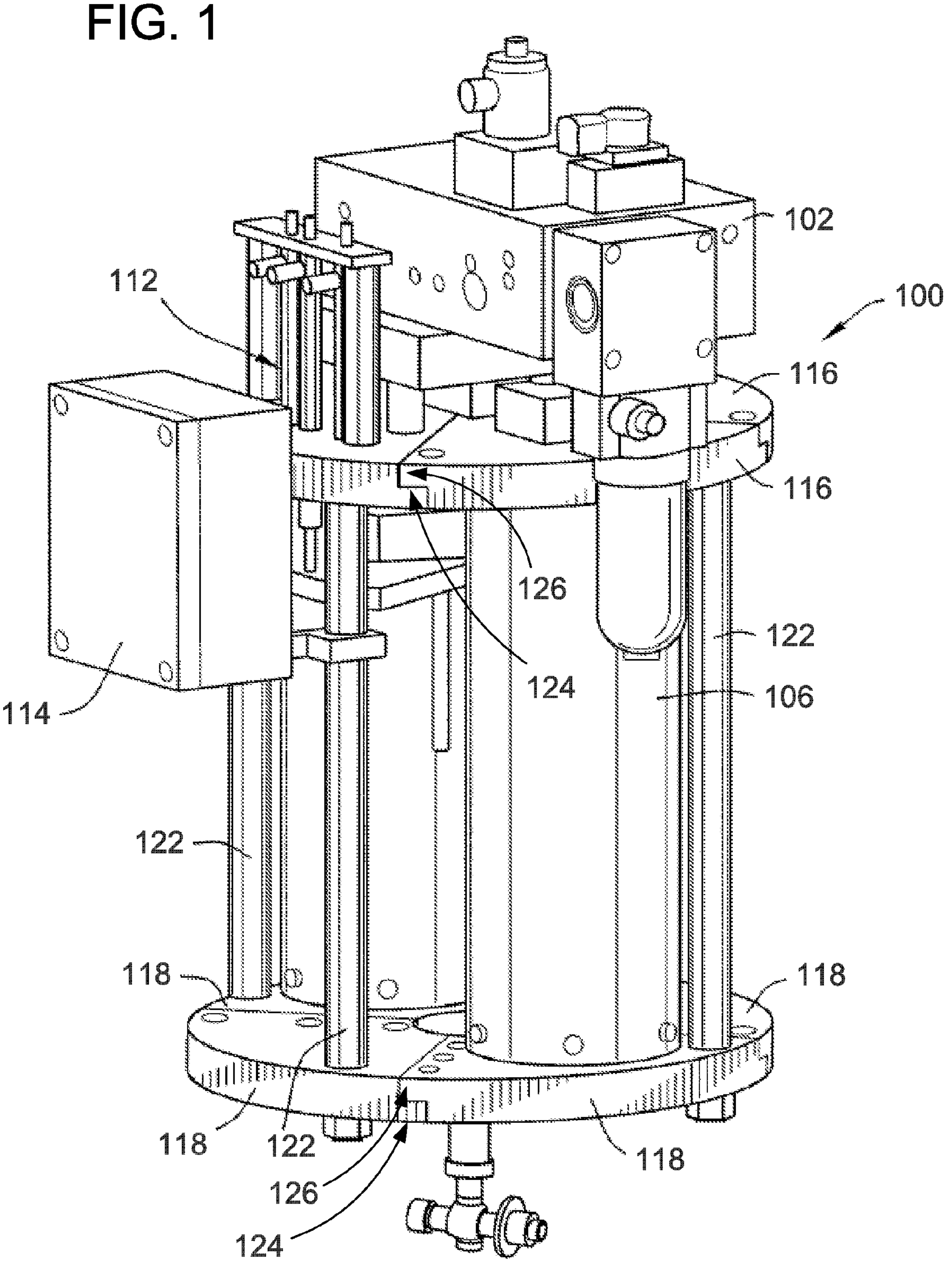
FIG. 1 is a schematic view of an exemplary embodiment of a hydraulic system in accordance with the teachings of the present invention.
Figure 2:
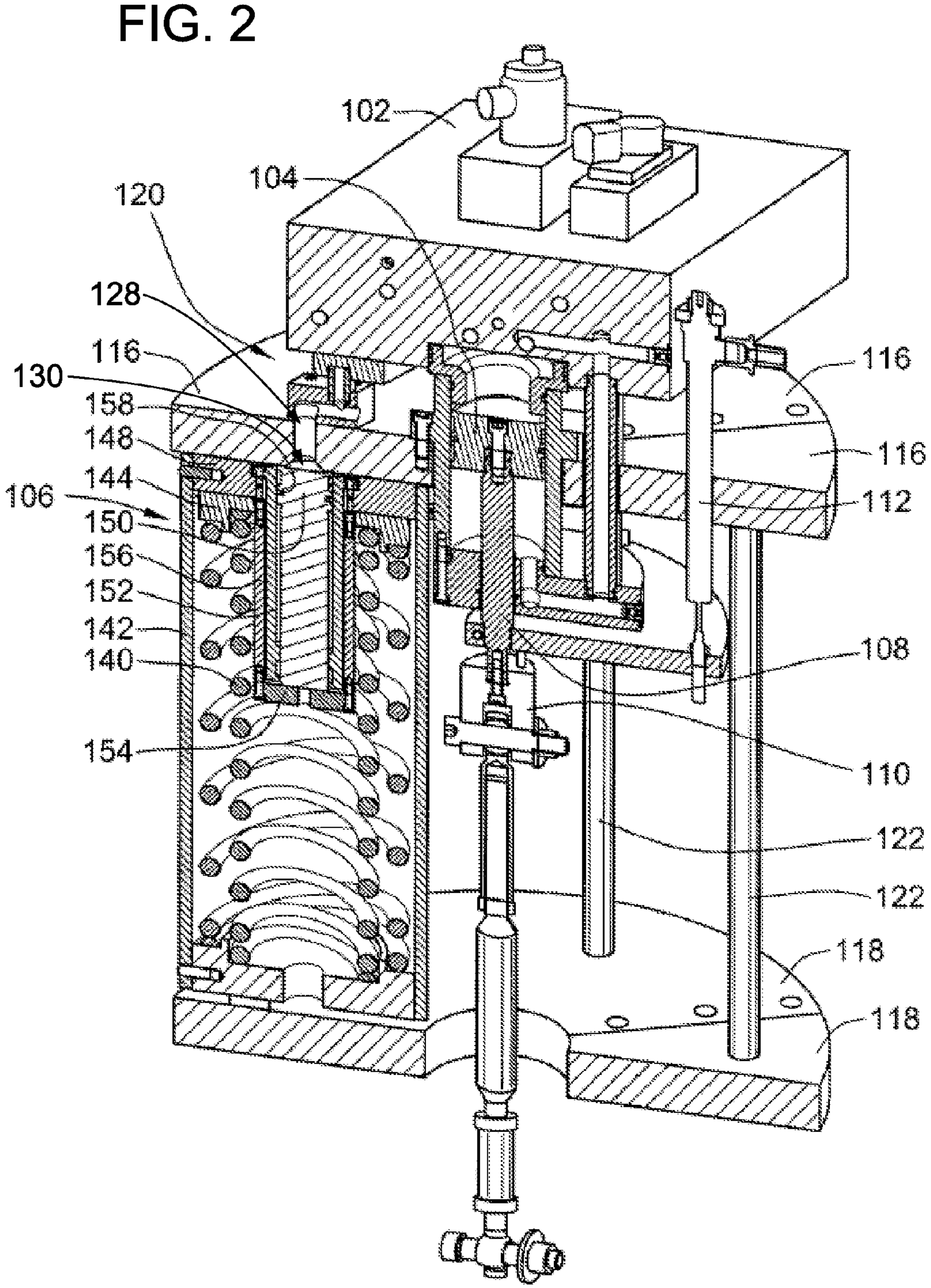
FIG. 2 is an isometric cross-sectional view of the hydraulic system of claim 1.
Figure 3:
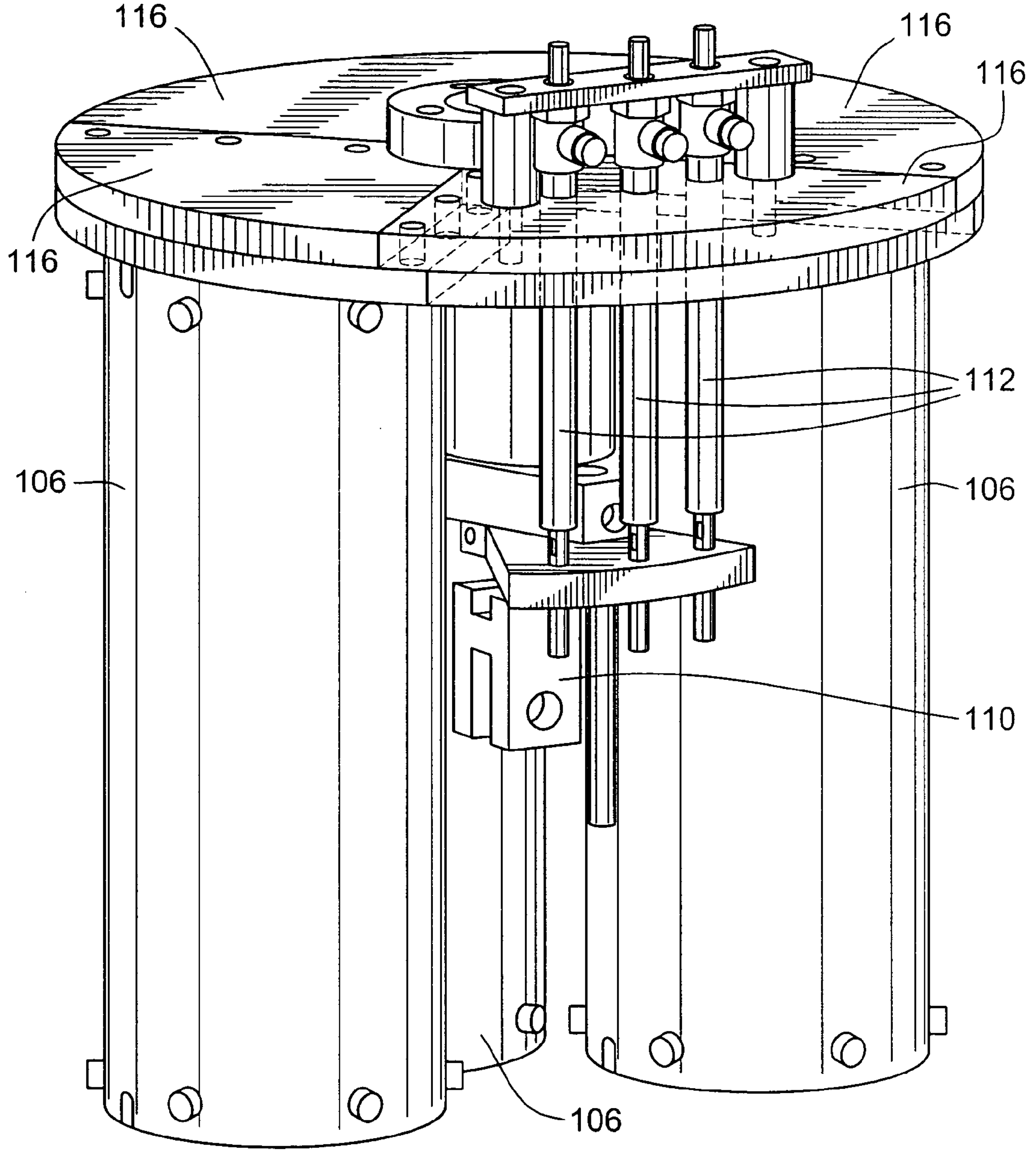
FIG. 3 is an isometric partial view of the hydraulic system of claim 1 showing redundant accumulators.
Figure 4:
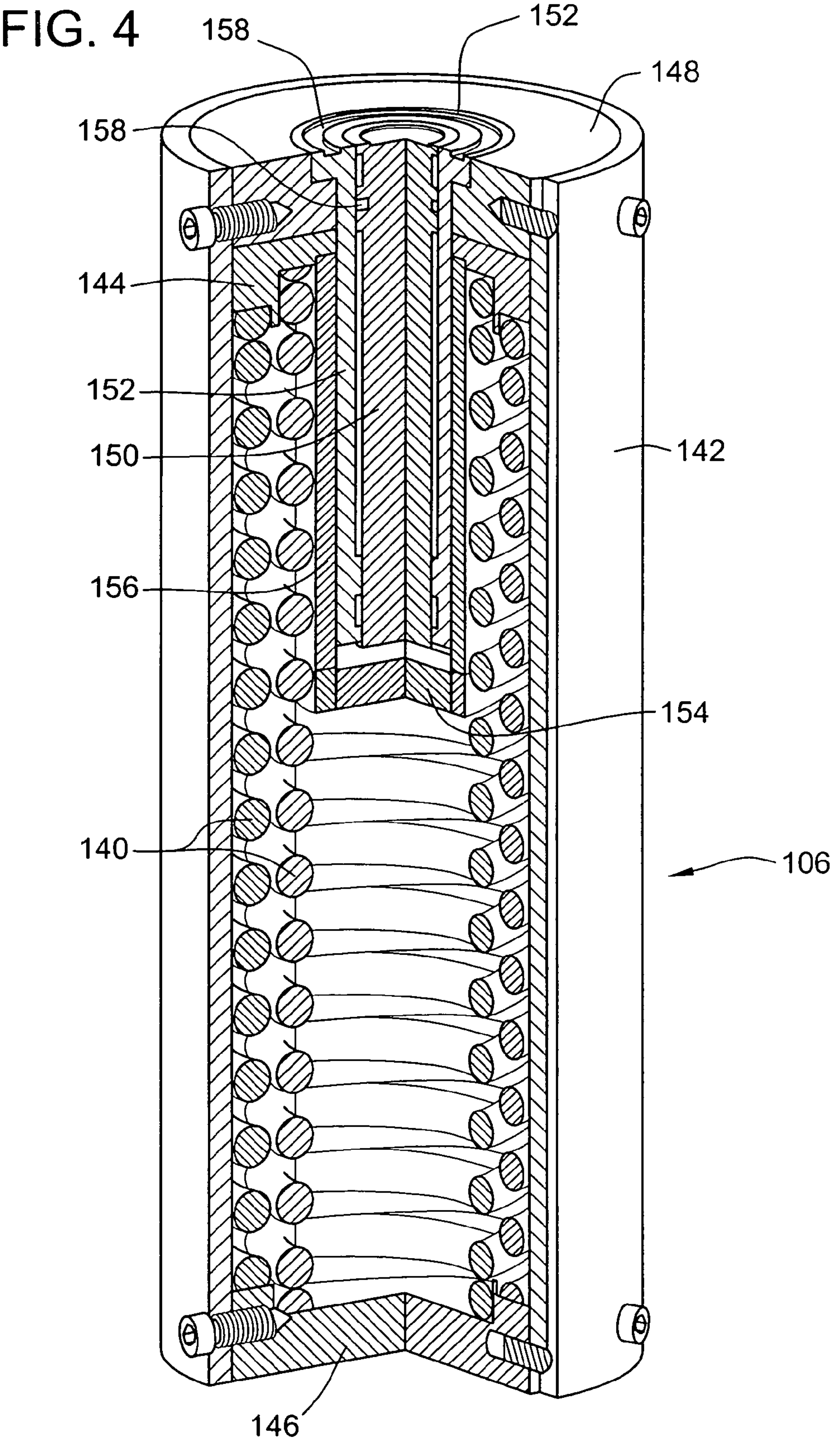
FIG. 4 is a cross-sectional view of an accumulator in accordance with the teachings of the invention.
Figure 5:
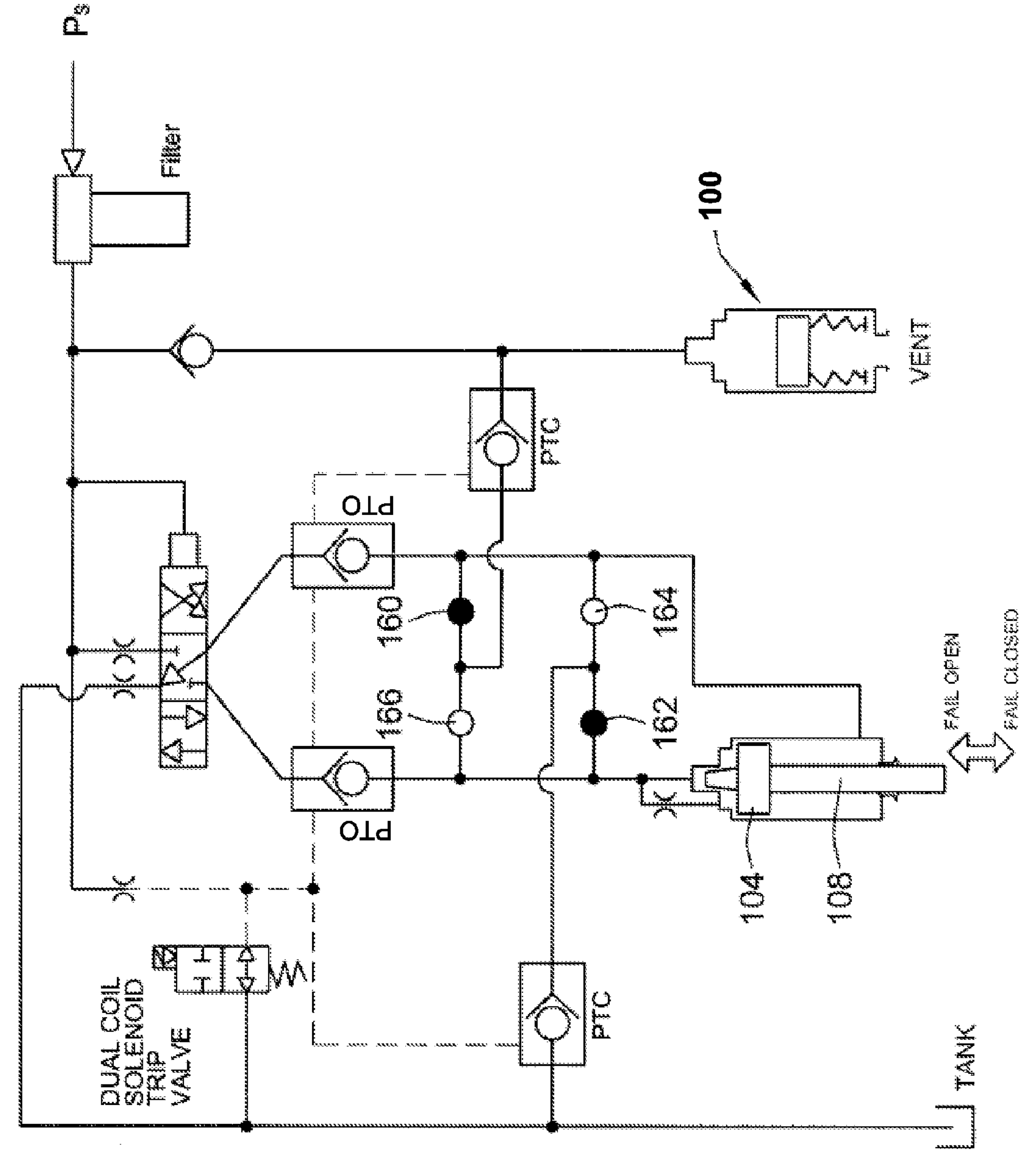
FIG. 5 is a line diagram of a hydraulic system in accordance with the teachings of the invention having the capability of operating as a fail open or a fail closed system.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention overcomes many problems of traditional accumulators by providing a failsafe electro-hydraulic actuator having multiple accumulators integrated into the actuator to provide fail-safe functionality. The integration of the accumulators results in a fully tested and validated, redundant fail-safe actuator. The membrane and nitrogen charged of the typical accumulator is replaced with a spring-loaded piston accumulator. With the use of multiple accumulators built into the actuator, any accumulator can cease to function properly and the other accumulators will fully stroke the actuator/valve to its fail-safe condition.

Turning now to the drawings wherein like reference numerals refer to like elements, the invention is illustrated as being implemented in a suitable operating environment. Although not required, the invention will be described in the general context of an electro-hydraulic actuator. Those skilled in the art will appreciate that the invention may be practiced with other configurations where accumulators are used.

Turning now to the figures, a hydraulic actuator 100 is illustrated. The actuator 100 is a double acting actuator. Those skilled in the art will appreciate that the invention may be implemented on other types of actuators, including, for example, single acting actuators. The hydraulic actuator 100 is only one example of a suitable operating environment and is not intended to suggest any limitation as to the scope of use or functionality of the invention. Neither should the actuator 100 be interpreted as having any dependency or requirement relating to any one or combination of components illustrated in the exemplary actuator 100.

The hydraulic manifold 102 provides control fluid to the hydraulic piston 104 and to accumulators 106. The piston 104 is connected to output rod 108 and may be used to control valves (not shown) by connecting the output shaft clevis 110 to the valve stem of the valve. The LVDTs (linear-voltage differential transformer [also known as linear variable differential transformer]) 112 provide position information of the piston to the electrical junction box 1114. While a single LVDT may be used, multiple LVDTs are used for redundancy and increased reliability of the system. Operation of the actuator is well known and need not be discussed in detail herein. For purposes of clarity, not all connections or piping is shown in the figures.

Each accumulator 106 is connected to actuator 100 via modular structures 116, 118. Modular structure 116 connects an accumulator 106 to the manifold 102 via a collection block 120. Modular structure 118 connects the bottoms of the accumulators to the actuator 100 and support shafts 122.

The modular structures 116, 118 have interlocking flanges 124, 126 with bolt holes for attaching the structures to other structures. The collection block 120 has passageways 128 to connect fluid in the manifold 102 to the accumulators 106. The support shafts 122 provide stiffness to the actuator 100. Alternatively, the modular structures 116 and 118 along with collection block 120 may be replaced with hydraulic tubing that directly connects the accumulators 106 to the hydraulic manifold 102.

The accumulators 106 replace the nitrogen of typical accumulators with coil springs 140. The coil springs 140 are nested within the cylindrical housing 142 and are seated upon spring seat 144 and the spring bottom plate 146. The spring bottom plate 146 forms the bottom of the accumulator 106. The nested coil springs 140 and spring seat 144 are held within cylindrical housing 142 via a spring top plate 148 that is attached to the cylindrical housing 142. The accumulators 106 replace the bladder of typical accumulators with piston 150. The piston 150 does not deteriorate over time.

The piston 150 is located in a sleeve 152 that, in combination with the piston 150, forms a storage cavity 130 for hydraulic fluid as will be discussed herein. The piston 150 has a base 154 that is attached to side wall 156. The side wall 156 is also connected to spring seat 144. Seals 158 prevent fluid from leaking into the area of the accumulator 106 where the springs 140 are located. During operation, the actuator hydraulic manifold 102 stores energy in the accumulator by allowing hydraulic supply pressure to push the piston 150, thereby compressing the fluid (and the coil springs 140 from their default state). A check valve (not shown) prevents supply pressure from bleeding back into the supply system. During normal operation, the compressed fluid remains in the accumulators 106. When the valve 100 is required to move to its fail-safe condition (i.e., piston 104 is in its open or closed condition), the manifold releases the stored energy from the accumulators 106. The compressed springs 140 return to their default state, thereby releasing and pushing the compressed fluid (i.e., the stored energy) from the accumulators 106 to move the actuator to its safe condition.

The use of multiple accumulators 106 provides fault tolerance (i.e., redundancy). If an accumulator fails (e.g., a spring failure, a bound piston, etc.), the remaining accumulators provide sufficient energy to move the actuator to its safe condition. The charge stored in the accumulators in one embodiment are sized such that the remaining accumulators have sufficient stored energy to move the actuator to its fail-safe condition if an accumulator fails. In another embodiment, the accumulators are sized to move the actuator to its fail-safe condition if multiple accumulators fail.

It is possible that a spring 140 may fail. In one embodiment, visual indicators are provided on the cylindrical housing 142 that allow inspection of the springs 140 as well as confirmation of the charge status of the accumulator (i.e., position of spring seat 144). The visual indicators also provide the ability to determine if the piston 150 is bound or otherwise stuck in the accumulator 106.

As previously indicated, the accumulators 106 move the actuator to its fail-safe condition. The fail-safe condition may be either the open position (i.e., Fail Open) or the closed position (i.e., Fail Closed). In one embodiment, the actuator is easily modified in the field for either Fail Open or Fail Closed by setting the location of plugs 160-166 located in the manifold 106. Plugs 160, 162 are installed to put the actuator 100 in a Fail Closed mode. Plugs 164, 166 are installed to put the actuator 100 in a Fail Open mode. The use of plugs provides the capability of using the same manifold in both Fail Open and Fail Closed modes of operation.

From the foregoing, it can be seen that a high loading actuator with built-in fail safes has been described. The invention can be used in many situations. For example, it can be used as a steam valve for a steam turbine. Multiple accumulators are integrated into the actuator to provide additional reliability. One or more accumulators can fail and the remaining accumulators provide sufficient energy to move the actuator to its fail-safe condition.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A electro-hydraulic actuator comprising:

a hydraulic manifold;

a hydraulic piston in fluid communication with the hydraulic manifold, the hydraulic piston having a piston housing;

an accumulator housing having a top plate and a bottom plate;

at least one nested spring having a first end seated on the bottom plate and a second end seated on a spring seat;

a plurality of accumulators, each accumulator in fluid communication with the hydraulic manifold and the hydraulic piston, each accumulator connected to a top structure and a bottom structure, the piston housing and the hydraulic manifold connected to the top structure, wherein the plurality of accumulators is sized such that at least one of the plurality of accumulators can fail to work properly when required and the remaining plurality of accumulators will stroke the hydraulic piston to a fail-safe condition; and an accumulator piston assembly attached to the spring seat, the accumulator piston assembly in fluid communication with the hydraulic manifold, wherein the bottom structure comprises a plurality of modular structures and wherein the bottom plate is attached to one of the plurality of modular structures.

2. The electro-hydraulic actuator of claim 1 wherein each of the plurality of modular structures have interlocking flanges.

3. The electro-hydraulic actuator of claim 1 wherein the top structure comprises a plurality of modular structures and wherein each accumulator is connected to one of the plurality of modular structures.

4. The electro-hydraulic actuator of claim 3 wherein each one of the plurality of modular structures has a passageway for connecting the accumulator to the hydraulic manifold.

5. The electro-hydraulic actuator of claim 1 wherein the accumulator piston assembly comprises:

an accumulator piston having a top surface and a base; and a wall attached to the base and the spring seat, the wall surrounding the accumulator piston.

6. The electro-hydraulic actuator of claim 5 further comprising a sleeve surrounding the accumulator piston, the sleeve located between the wall and the accumulator piston and wherein the sleeve retains fluid supplied from the manifold when the at least one nested spring is compressed.

7. The electro-hydraulic actuator of claim 6 wherein a top of the sleeve is located in approximately the same plane as the top plate.

8. The electro-hydraulic actuator of claim 6 wherein the sleeve and a top of the accumulator piston forms a cavity for retaining fluid supplied from the manifold when the at least one spring is compressed.

9. The electro-hydraulic actuator of claim 1 wherein the top structure is a modular top structure and the bottom structure is a modular bottom structure and the piston housing and the hydraulic manifold are connected to at least one modular top structure.

10. The electro-hydraulic actuator of claim 9 wherein each modular top structure has a passageway for connecting one of the plurality of accumulators to the hydraulic manifold.

11. The electro-hydraulic actuator of claim 9 wherein each of the plurality of modular structures has interlocking flanges.

12. The electro-hydraulic actuator of claim 9 wherein the accumulator piston assembly comprises:

an accumulator piston having a top surface and a base; and a wall attached to the base and the spring seat, the wall surrounding the accumulator piston.

13. The electro-hydraulic actuator of claim 12 further comprising a sleeve surrounding the accumulator piston, the sleeve located between the wall and the accumulator piston and wherein the sleeve retains fluid supplied from the manifold when the at least one nested spring is compressed.

14. The electro-hydraulic actuator of claim 13 wherein a top of the sleeve is located in approximately the same plane as the top plate.

15. The electro-hydraulic actuator of claim 13 wherein the sleeve and a top of the accumulator piston forms a cavity for retaining fluid supplied from the manifold when the at least one spring is compressed.

* * * * *